United States Patent
Duarte et al.

(10) Patent No.: US 9,280,255 B2
(45) Date of Patent: Mar. 8, 2016

(54) STRUCTURED DISPLAYING OF VISUAL ELEMENTS

(75) Inventors: Matias G. Duarte, Sunnyvale, CA (US); Daniel Marc G. Shiplacoff, Los Angeles, CA (US); Paul Mercer, Palo Alto, CA (US); Ralph Thomas, Palo Alto, CA (US); Jeremy G. Lyon, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 1753 days.

(21) Appl. No.: 12/128,486

(22) Filed: May 28, 2008

(65) Prior Publication Data

US 2009/0300542 A1    Dec. 3, 2009

(51) Int. Cl.
*G06F 3/048* (2013.01)
*G06F 3/0481* (2013.01)

(52) U.S. Cl.
CPC .................... *G06F 3/0481* (2013.01)

(58) Field of Classification Search
USPC ....................................................... 715/800
See application file for complete search history.

(56) References Cited

U.S. PATENT DOCUMENTS

| | | | |
|---|---|---|---|
| 2001/0047626 A1* | 12/2001 | Ohkado | 49/506 |
| 2004/0163046 A1* | 8/2004 | Chu et al. | 715/517 |
| 2005/0229110 A1* | 10/2005 | Gegner et al. | 715/800 |
| 2006/0200778 A1* | 9/2006 | Gritzman et al. | 715/781 |
| 2007/0274608 A1* | 11/2007 | Le Leannec et al. | 382/299 |
| 2009/0132590 A1* | 5/2009 | Huang | 707/104.1 |

OTHER PUBLICATIONS

PCT International Search Report and Written Opinion, PCT Application No. PCT/US2009/041035, Oct. 5, 2009, 9 pages.

* cited by examiner

*Primary Examiner* — Boris Pesin
*Assistant Examiner* — Angie Badawi
(74) *Attorney, Agent, or Firm* — Kilpatrick Townsend & Stockton LLP

(57) ABSTRACT

Presentation descriptions are provided to an operating system of a computing device to present outputs associated with the applications in an organized and intuitive manner to the user. The presentation descriptions provide the operating system with information about the structure and meaning of the output element. The task of organizing at least part of the output elements associated with applications is delegated to the operating system. The operating system analyzes the presentation descriptions, and organizes the output elements associated with the applications at least partly based on the presentation descriptions.

17 Claims, 11 Drawing Sheets

STRUCTURED DISPLAYING OF VISUAL ELEMENTS

BACKGROUND

1. Field of Art

The disclosure generally relates to the field of user interfaces, and more specifically, to a user interface that scales visual elements of windows at different ratios.

2. Description of the Related Art

On conventional computing devices, more than one application may be launched and operated simultaneously. Each application may display related information in one or more windows. Graphical user interfaces of such conventional computing devices generally allow one or more windows to be displayed on the screen of the computing devices. Such windows may be resized and relocated based on user's preferences. Specifically, the size of a window may be decreased or minimized to display more numbers of windows or provide a more general overview of applications running of the computing device. Conversely, the size of the window may be increased or maximized to display more detailed information about the application.

One class of conventional operating systems allows users to locate windows by providing descriptions of the windows at predetermined locations of the windows (for example, at the top of the windows). When the windows are minimized into thumbnails, the description of the windows may be provided adjacent to the minimized thumbnails. The users may identify the windows from the descriptions of the windows and then perform predetermined actions (for example, double-clicking cursor on the thumbnail) to expand the thumbnails into windows.

Another class of conventional operating systems allows users to locate a desired window by displaying thumbnails of windows. The thumbnails are scaled-down versions of the windows, which displays all of the contents in the open window in a shrunk format. The users may move cursors over the thumbnail and select the thumbnail to expand it into a window. All the contents in the thumbnails, however, are scaled down at equal ratio. Therefore, the letters or other identifications appearing in the thumbnails are also scaled down, making it difficult for the users to discern which thumbnails represent which windows. The scaling of windows into thumbnails also requires computational resources because all the contents displayed on the open windows must be bitmap scaled.

Hence, the current state of the art lacks, inter alia, a user interface and corresponding system and method for allowing users to easily and promptly identify a certain window from multiple windows or thumbnails displayed on a display screen of a computing device.

SUMMARY

One embodiment of a disclosed system (and method) provides a presentation description associated with an application program to allow presenting of the output elements (e.g., visual elements) in a format suitable for a view (e.g., window) of the application program. The presentation descriptions describe the structure of the output elements (e.g., importance of one output element over another output element, and relationships between the output elements). The presentation descriptions are provided to and analyzed by a hardware component or a software component (e.g., operating system) that is responsible for presenting the output elements to the user. The hardware or software component responsible for presenting the output elements to the user may selectively choose the output elements to be presented and their configuration based at least on the presentation descriptions.

In one embodiment, the presentation descriptions describe the structure of visual elements (e.g., bars, cursors, icons, images, texts) associated with applications on a display screen (e.g., handheld computing device screen). Each of the applications generates or stores a presentation description provided to a display manager to render views (e.g., windows) of the applications on the display screen. The display manager may be a component of the operating system running on a computing device. Each presentation description defines the logical structure of visual elements associated with an application. The display manager analyzes the presentation description received from the application, and determines how and which visual elements should be displayed in the view of the application.

In one embodiment, the display manager determines whether a visual element should be displayed in a resized view of the application. For example, visual elements that convey information of lower priority (e.g., texts indicating properties of an image) are removed when the resized view is decreased in size. Visual elements that have higher priority (e.g., image itself) may be maintained in the resized view. The removed visual elements may be reintroduced when the view is expanded.

In one embodiment, the display manger also determines the configuration of the visual elements present in the resized view of the application. The configuration of the visual elements includes, among others, the size, the location, the color, and the orientation of the visual elements.

In one embodiment, the display manager also receives display device information representing the hardware configuration (e.g., size of the display screen) of the display screen. The display manager may determine the visual elements and the configuration of the visual elements based on the hardware configuration of the display screen.

In one embodiment, the display manager also receives user preferences for displaying the visual elements on the display screen. The user preferences may indicate a user's preferences such as the minimum size of visual elements, the priority of visual elements to be displayed on the display screen, and the size of reduced views.

In one embodiment, the display manager stores transition schemes for generating the subsequent views for one or more classes of applications. The predetermined transition scheme for a class of applications may indicate whether a visual element associated with the application should be predominantly cropped or scaled down when the size of the transitioned view is reduced. The display manager may also determine the class of an application based on the presentation description of the application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Figure 1:
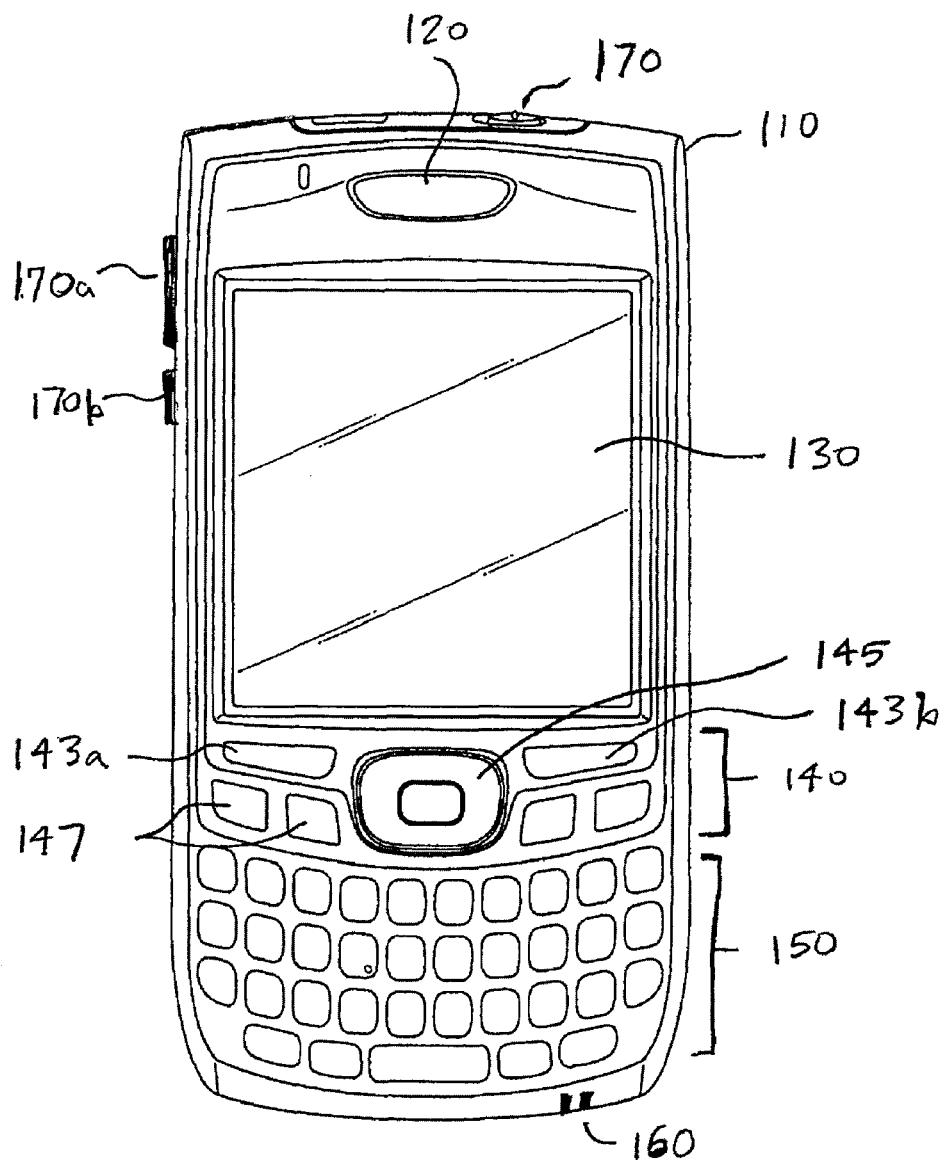
FIG. 1 illustrates one embodiment of a mobile computing device, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to separating presentation and contents of output elements associated with applications. The applications provide presentation descriptions representing 'presentation' of the output elements which provide the operating system with information about the logical structure of the output element. The applications also provide output messages representing 'content' of the output elements. The operating system analyzes the presentation descriptions to organize and render the output elements associated with the applications on one or more output devices in response to receiving the output messages. Advantages of employing the presentation description includes, among others, (i) more efficient generation of outputs for applications, (ii) providing a consistent outputs across multiple applications, and (iii) facilitation of a user's interaction with computing devices by automatically selecting the information to be presented to the user.

An output element refers to any units of outputs that may be generated and outputted by an output device of a computing device. The output element includes, among others, visual elements. The visual elements includes, among others, bars, cursors, icons, images, and a string of characters that may be recognized and understood by a user as conveying one or more pieces of information. The output elements of an application are selected, scaled or organized based on the presentation descriptions of the application.

A view of an application refers to a portion of an image on a display screen that displays information associated with the application. The view may include, among others, a window in a rectangular format. The view of the application may be resized or reoriented manually by the user or automatically by an algorithm executed on the computing device.

A logical structure of the output elements refers to the relationship between the output elements from which logical meaning of the output elements can be determined.

The presentation description refers to information representing the logical structure of the output elements. Like other information, an output generated by applications may be separated into 'content' and 'presentation.' The 'content' represents the actual information that the applications conveys to the user (e.g., turn-by-turn direction to a destination on a map) whereas the 'presentation' represents how the information is to be conveyed to the user (e.g., plotted on an image map or by a string of characters). The presentation description corresponds to the presentation of the output. The content portion of the output separate from the presentation description is referred to as an output message herein. The presentation description may be stored in the application or be generated by the application upon request. In one embodiment, the presentation descriptions follow a uniform convention that is used by one or more applications operable on a computing device. For example, the presentation description may be described in a markup language (e.g., Extensible Markup Language) with tags indicating the category or relationship between the output elements.

Example Mobile Computing Device

FIG. 1 illustrates one embodiment of a mobile computing device 110 with telephonic functionality, e.g., a mobile phone or a smartphone. The mobile computing device is configured to host and execute a phone application for placing and receiving telephone calls. For ease of understanding, the principles disclosed herein are described in the context of a mobile computing device 110 with telephonic functionality. The following example embodiments are described below with reference to mobile computing devices primarily for the purpose of explanation. Other electronic devices with computation capabilities such as a television, a desktop computer, a laptop computer, a watch, an e-book reader, and an electronic picture frame may also employ the technique or scheme described herein.

The mobile computing device 110 includes a speaker 120 a screen 130 a navigation area 140 a keypad area 150 and a microphone 160. The mobile computing device 110 also may include one or more switches 170, 170a, 170b (collectively referred to as switches 170). The one or more switches 170 may be buttons, sliders, or rocker switches and can be mechanical or solid state (e.g., touch sensitive solid state switch).

The screen 130 of the mobile computing device 110 is implemented, for example, by an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data. The navigation area 140 is configured to control functions of an application executing in the mobile computing device 110 and visible through the screen 130.

Figure 2:
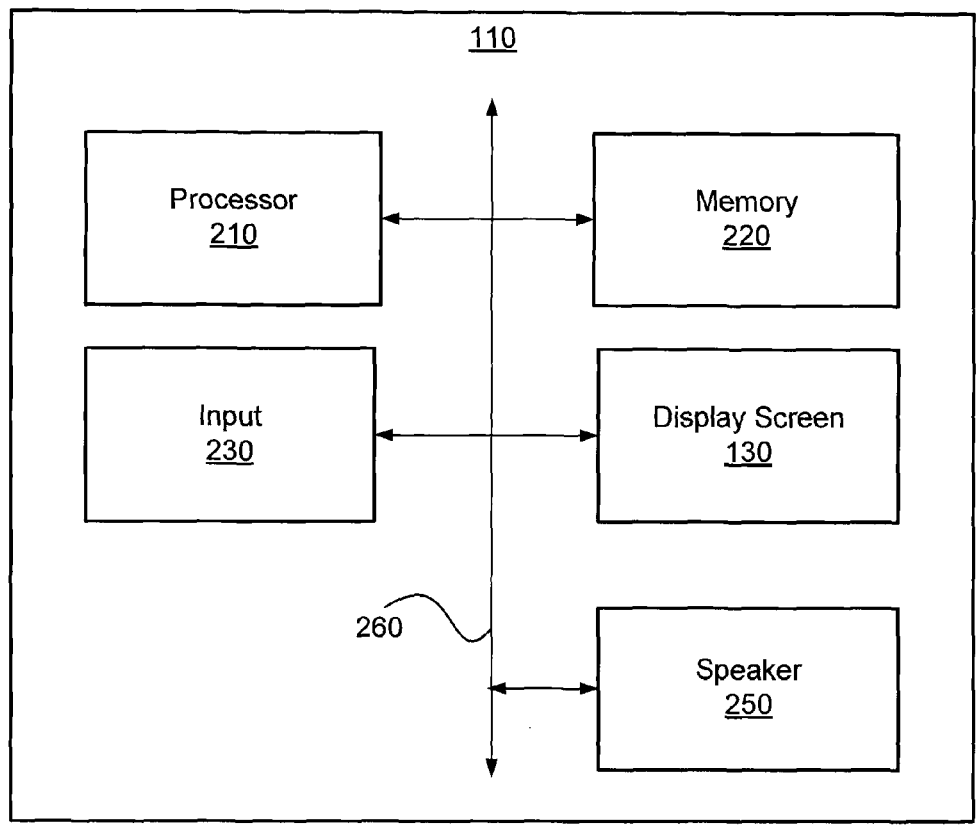
FIG. 2 is a block diagram illustrating a mobile computing device, according to one embodiment.

Referring next to FIG. 2, a block diagram illustrates one embodiment of an example architecture of a mobile computing device 110 with telephonic functionality. By way of example, the architecture illustrated in FIG. 2 will be described with respect to the mobile computing device of FIG. 1. The mobile computing device 110 includes, among other components, a processor 210, a memory 220, an input module 230, a display screen 130 and a speaker 250. These components of the mobile computing device 110 communicate via a bus 260.

The processor 210 is associated with the memory 220 to execute instructions for operating mobile computing device 110. The memory 220 stores various software components, as described below in detail with reference to FIG. 3B. The memory 220 can be implemented by various storage devices including, a flash memory device, a hard disk, a floppy disk, and Random Access Memory (RAM).

The input module 230 receives various user inputs associated with the operation of the mobile computing device 110. The input module 230 includes, among others, switches, keypads, and touch-sensitive displays. The mobile computing device 110 includes one or more output modules or elements. In the example of FIG. 2, the mobile computing device 110 includes a display screen 130 and a speaker 250.

Figure 3A:
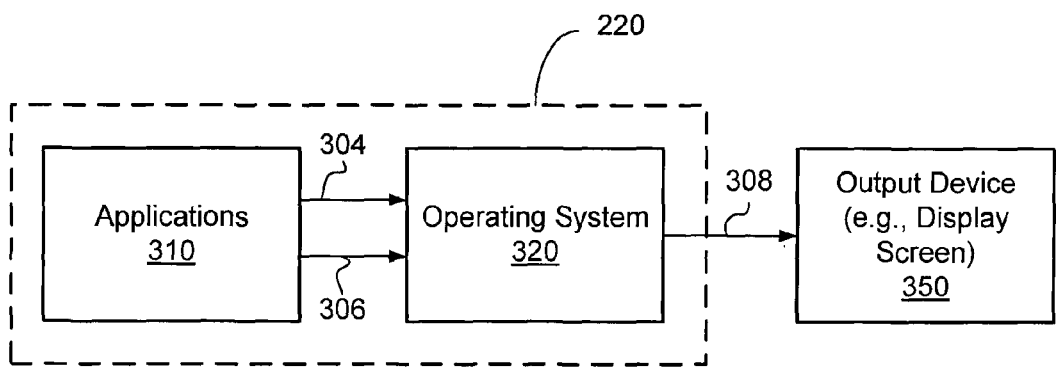
FIG. 3A is a functional block diagram illustrating cooperative operation between applications, an operating system and an output device, according to one embodiment.

FIG. 3A is a functional block diagram illustrating cooperative operation between applications 310, an operating system 320 and an output device 350, according to one embodiment. Each of the applications 310 provides presentation description 304, and output messages 306 to the operating system 320. The presentation description 304 describes the structure of the output elements associated with each application 310. The presentation description 304 allows the logical meaning (e.g., which visual elements convey which types of information and how the visual elements are correlated) of the output elements to be determined.

In one embodiment, the presentation description 304 for an application is provided to the operating system 320 for registration and stored in the operating system 320 for reference. In another embodiment, the presentation description 304 is provided by each of the applications 310 when a new view for the application 310 is to be generated. The following is an illustrative pseudo code for a presentation description 304 provided by an email client program that allows users to reading emails.

```
View: name="EmailFolder"
    Header:
        Group: importance=Heading
            Item: Image=currentFolderIcon
            Item: Text=currentFolder
```

-continued

```
        Group: importance=Note
            Item: Text=unreadCount
            Item: Text="unread"
    List: of=currentFolder.messageList scroll=free
    sort=newestTop groupBy=naturalDate,
        List Item:
            Choice: action=message.open
                Group:
                    Item: Image=message.status
                Group:
                    Item: Text=message.sender importance=emphasized
                    Item: Text=message.subject
                    Item: Text=message.preview importance=note
                Group: importance=note
                    Item: Image=message.priority
                    Item: Image=message.attachements
                    Item: Text=message.time format=naturalTime
MenuSet:
    Menu No Selection: Email Folder Actions
        Group:
            Item: Choice=synchNow
        Group: importance = Note
            Item: Text="Last Updated"
            Item: Text=lastSynch
        Group:
            Item: Choice=compseNewMessage
```

In the above code of the presentation description, visual elements for the email client program are structured to form two groups having different importance: (i) one group of visual elements having "importance" identified as "Heading", and (ii) another group of visual elements having "importance" identified as "Note." The operating system 320 provided with such code from the applications 310 determines the structure of the visual elements associated with the email client program based on the code and generates views on the display screen 130 after receiving the output messages 306 that indicates the contents from the email client program.

The output messages 306 are generated by the applications to convey the actual 'contents' of the output elements. The operating system 320 may determine the logical structure or meaning of the visual elements included in the output message 306 by referencing the presentation description 304. The operating system 320 then generates output signals 308 for the output device 350 to process by formatting the information in the output messages 306 according to the presentation description 304. The output device 350 converts the output signal 308 into physical manifestations (e.g., image and sound) that is presented to the user.

Example embodiments described herein are described primarily with reference to visual elements for displaying images on the display screen 130 as the output elements. The visual elements, however, are merely illustrative, and the same principle disclosed herein may be used for other types of outputs such as sounds.

Figure 3B:
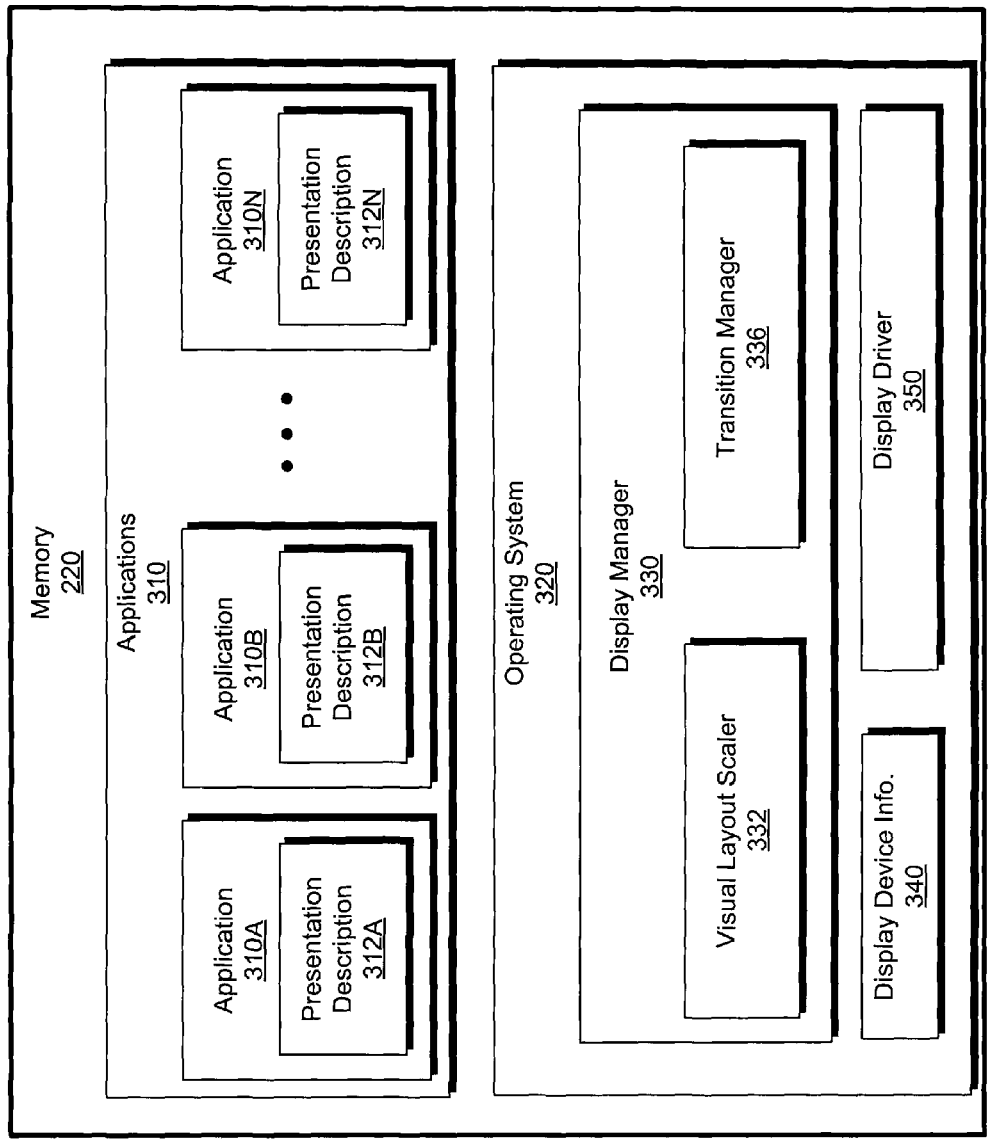
FIG. 3B is a block diagram of software components in a memory of the mobile computing device, according to one embodiment.

FIG. 3B is a block diagram illustrating software components stored in the memory 220, according to one embodiment. The memory 220 includes one or more applications 310A through 310N (collectively referred to as applications 310 herein) and an operating system 320. Each application 310A through 310N stores or generates a presentation description 312A through 312N describing the structure of outputs associated with each application 310A through 310N.

The operating system 320 includes, among other components, a display manager 330, display device information 340 and a display driver 350. The display manger 330, in conjunction with the display driver 350, functions to generate the output signal 308 provided to the display. The display device information 340 indicates the capability (e.g., resolution or screen size) of the display screen 130. In one embodiment, the display device information 340 is generated and stored in the operating system 320 during the installation of the operating system 320 or the display screen 130. The display manager 330 references the display device information 340 to generate the visual elements on the screen suitable for the display screen 130 as described below in detail with reference to FIG. 11.

Examples Embodiments of Display Manager

In one embodiment, the display manager 330 includes, among other components, a visual layout scaler 332 and a transition manager 336. The visual layout scaler 332 functions to determine the presence and the configuration of the visual elements associated with each application 310A through 310N, as described below in detail with reference to FIG. 4.

In one embodiment, the visual layout scaler 332 receives the presentation description 312 and the output messages 306 from the applications to generate information representing the visual elements in a present view and in a subsequent view of the application. Specifically, the visual layout scaler 332 creates three groups (e.g., sets) for visual elements: (1) visual elements common to the present view and the subsequent view; (2) visual elements in the present view that are removed in the subsequent view; and (3) visual elements that are not present in the present view and introduced into the subsequent view. Information about these three groups of visual elements and the configuration of these visual elements are sent to the transition manager 336 to generate transition views and the subsequent view.

The transition manager 336 uses information received from the visual layout scaler 332 and applies one or more transition styles to remove the present view, and render transition views and the subsequent view, for example, as described in a co-pending U.S. patent application Ser. No. 12/021,173, titled "Structured Display System with System Defined Transitions," filed on Jan. 28, 2008, which is incorporated by reference herein in its entirety. An example of the transition manager 336 is described below in detail with reference to FIG. 5.

Figure 4:
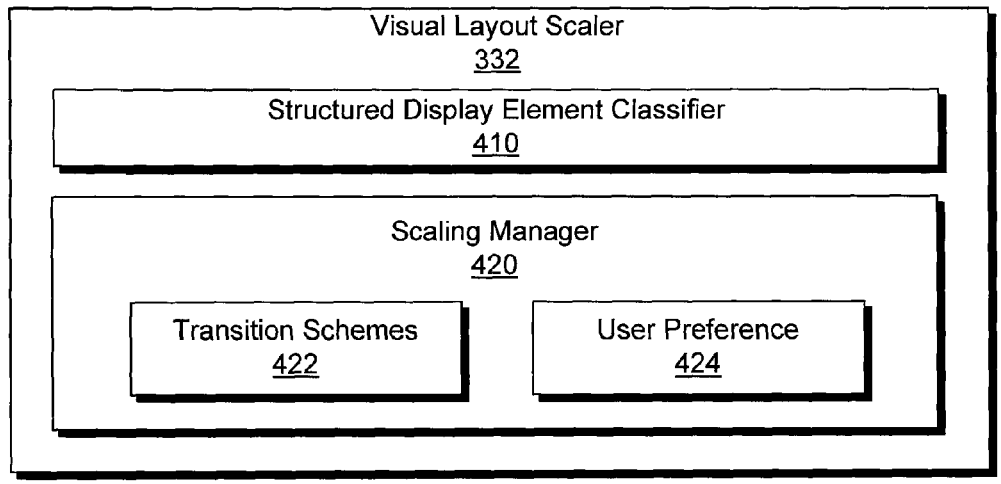
FIG. 4 is a block diagram of a visual layout scaler, according to one embodiment.

FIG. 4 is a block diagram of a visual layout scaler 332, according to one embodiment. The visual layout scaler 332 includes, among other components, a structured display element classifier 410 and a scaling manager 420. The structured display element classifier 410 analyzes the presentation description 312 of an application to determine the structure of the visual elements associated with the application based on the presentation description. Based on the determined structure of the visual elements, the visual layout scaler 332 determines which visual elements should be displayed in a subsequent view of the application and which visual elements should not be displayed in the subsequent view of the application.

By delegating the task of determining the visual elements to the visual layout scaler 332, the applications are relieved of the task of generating and organizing the outputs for different views. Other advantages of processing the visual elements at the visual layout scaler 332 includes, among others, elimination of code needed for rendering, formatting and processing visual elements from the applications. Because such code need not be included in the applications, the applications can be made more compact (e.g., fewer lines of codes). Further, the application view may be consistent across multiple applications. Also, the computation associated with displaying the visual elements may be reduced because visual elements are bitmap scaled selectively.

The scaling manager 420 also determines the configuration of the visual elements to be displayed in the subsequent view. The configuration of the visual elements includes, among others, size, location, color, and orientation of each visual element. The configuration of the visual elements may differ depending on, for example, the rank of importance as determined by the structured display element classifier or the user preference. For example, if the visual element is ranked high in priority, the visual element may maintain its size or undergo slight decrease in size while visual elements having lower priority are eliminated or reduced in size significantly in an application view with reduced size. These examples are further described below in detail with reference to FIGS. 6A through 9B.

The scaling manager 420 includes, among other components, transition schemes 422 and a user preference 424. The transition schemes 422 store various schemes for generating and transitioning to application views having different sizes. The transition schemes 422 describe how the application view should be modified in a subsequent application view depending on the type of applications. For example, the transition schemes 422 determines whether a visual element should be cropped, scaled down or both when the size of the application view is reduced in size.

In one embodiment, the transition schemes 422 include a predetermined number (e.g., four (4)) distinct schemes for a predetermined number (e.g., four (4)) different types of applications: (i) applications displaying regular or repeating visual elements with equal importance (e.g., email client programs, as described below in detail with reference to FIGS. 6A through 6C), (ii) applications displaying irregular and arbitrary visual elements with equal importance (e.g., a photograph editing program, as described below in detail with reference to FIGS. 9A and 9B), (iii) applications displaying regular or repeating visual elements having a point of interest (e.g., an instant messenger program, as described below in detail with reference to FIGS. 8A and 8B), and (iv) applications displaying irregular and arbitrary visual elements having a point of interest (e.g., a map service application, as described below in detail with reference to FIGS. 7A and 7B). These four types of applications need different scaling schemes to determine which visual element representing which information should be removed or maintained, and how the configuration of the visual elements should be changed, as described below in detail with reference to FIGS. 6A through 9B. The classification into four types of applications is merely illustrative and different classification may also be used.

In one embodiment, the schemes stored in the transition schemes 422 may be overridden by the user preference or limitations of the display device as indicated by the display device information 340. For example, assume that the default scheme of transition schemes 422 is to a scaled-down visual element by a ratio of 1:N (where N is a value greater than 1) with no cropping. But if the visual elements are scaled-down (scaled) at this ratio, the visual elements become unrecognizable or illegible at the current screen size of the display device. Then, the visual layout scaler 332 may modify the scheme stored in the transition schemes 422 so that cropping is performed on the visual elements in conjunction with scaling down of the visual elements at a lower ratio.

The user preference 424 stores user preference identified by the user of the mobile computing device 110. The user preference 424 indicates, among others, the minimum font size for visual elements, preferred color schemes for the resized application views, transition schemes to be used for different applications, the priority of information to be displayed, and the size of reduced views.

Figure 5:
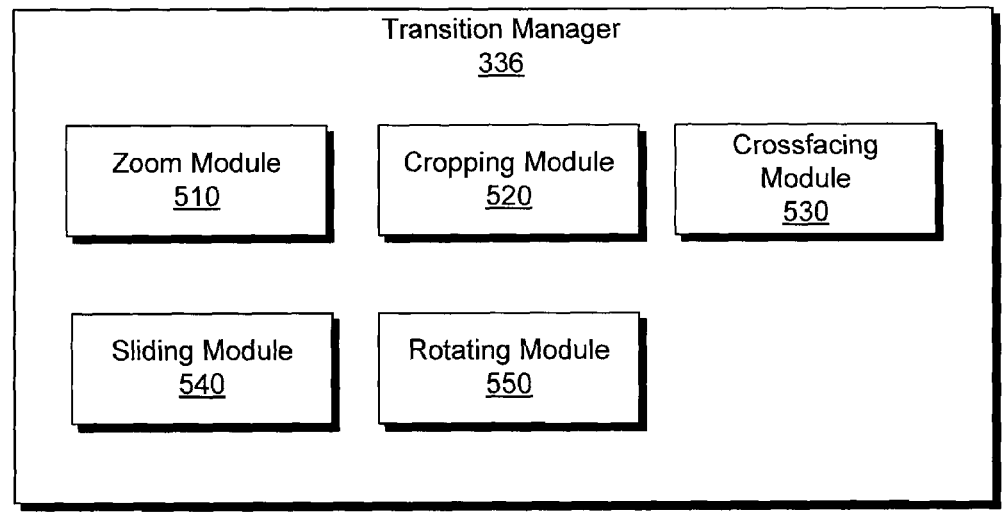
FIG. 5 is a block diagram of a transition manager, according to one embodiment.
Figure 6:
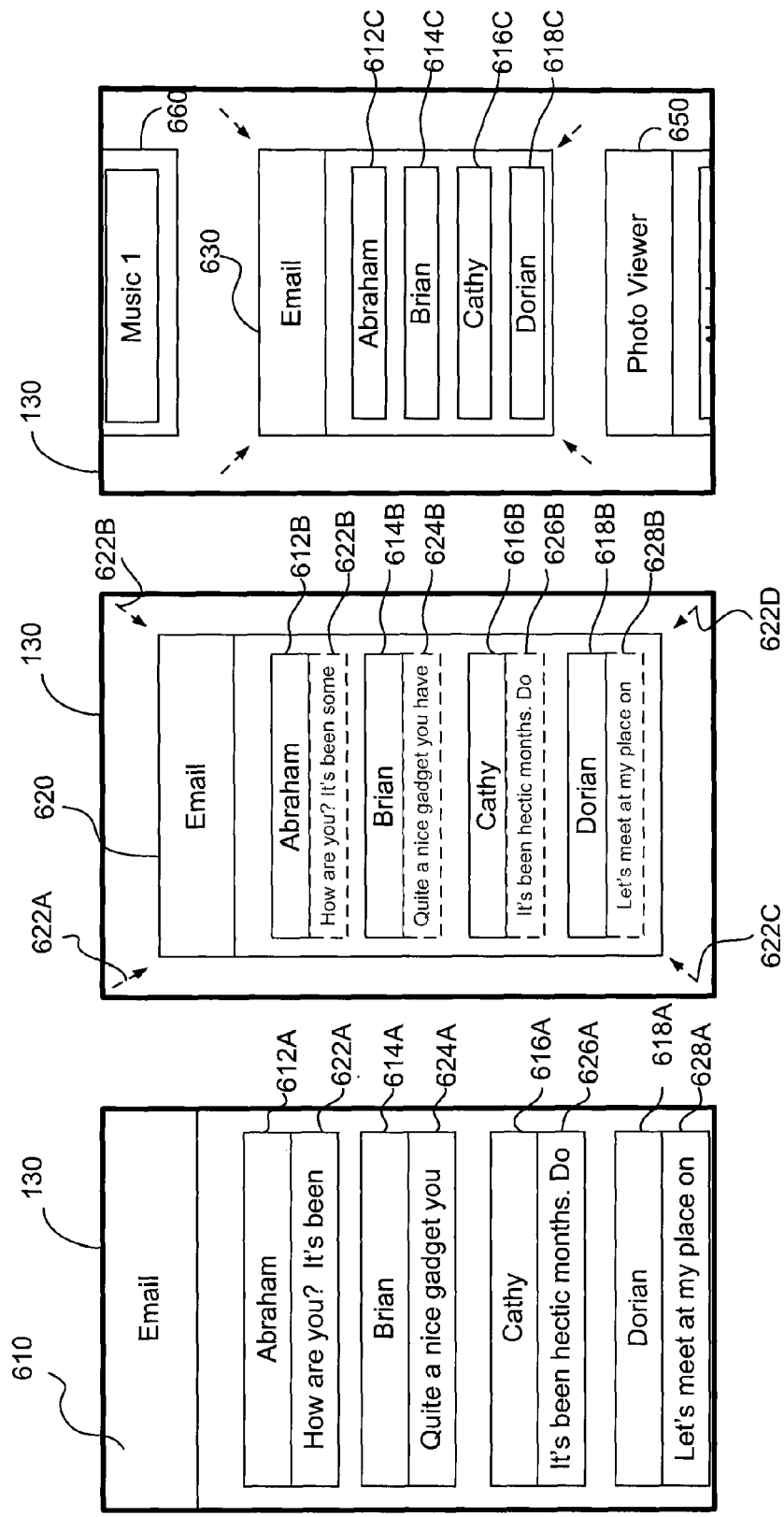
FIGS. 6A to 6C are diagrams illustrating a current view, a transition view, and a resized view for an email application, according to one embodiment.
Figure 7:
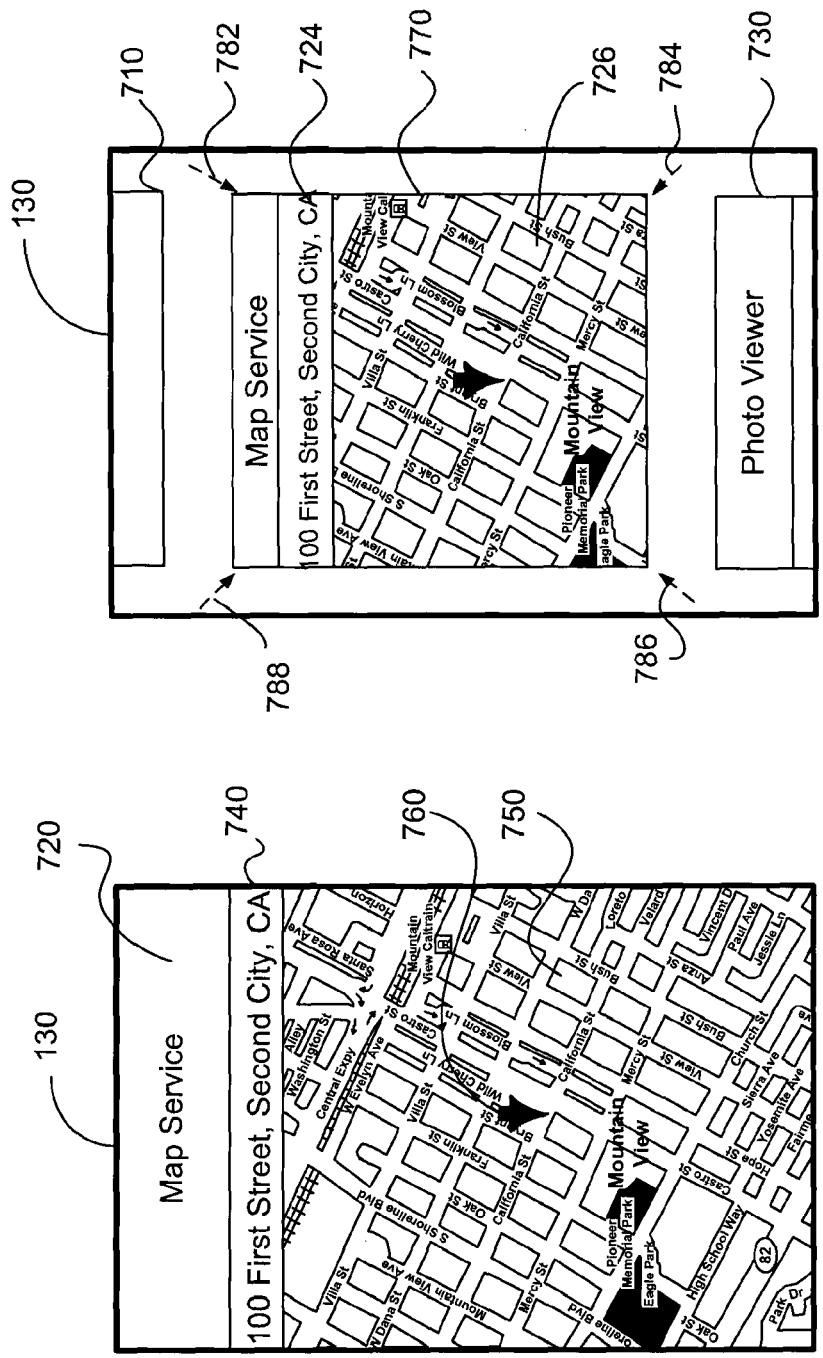
FIGS. 7A and 7B are diagrams illustrating a present view and a resized view for a map service application, according to one embodiment.
Figure 8:
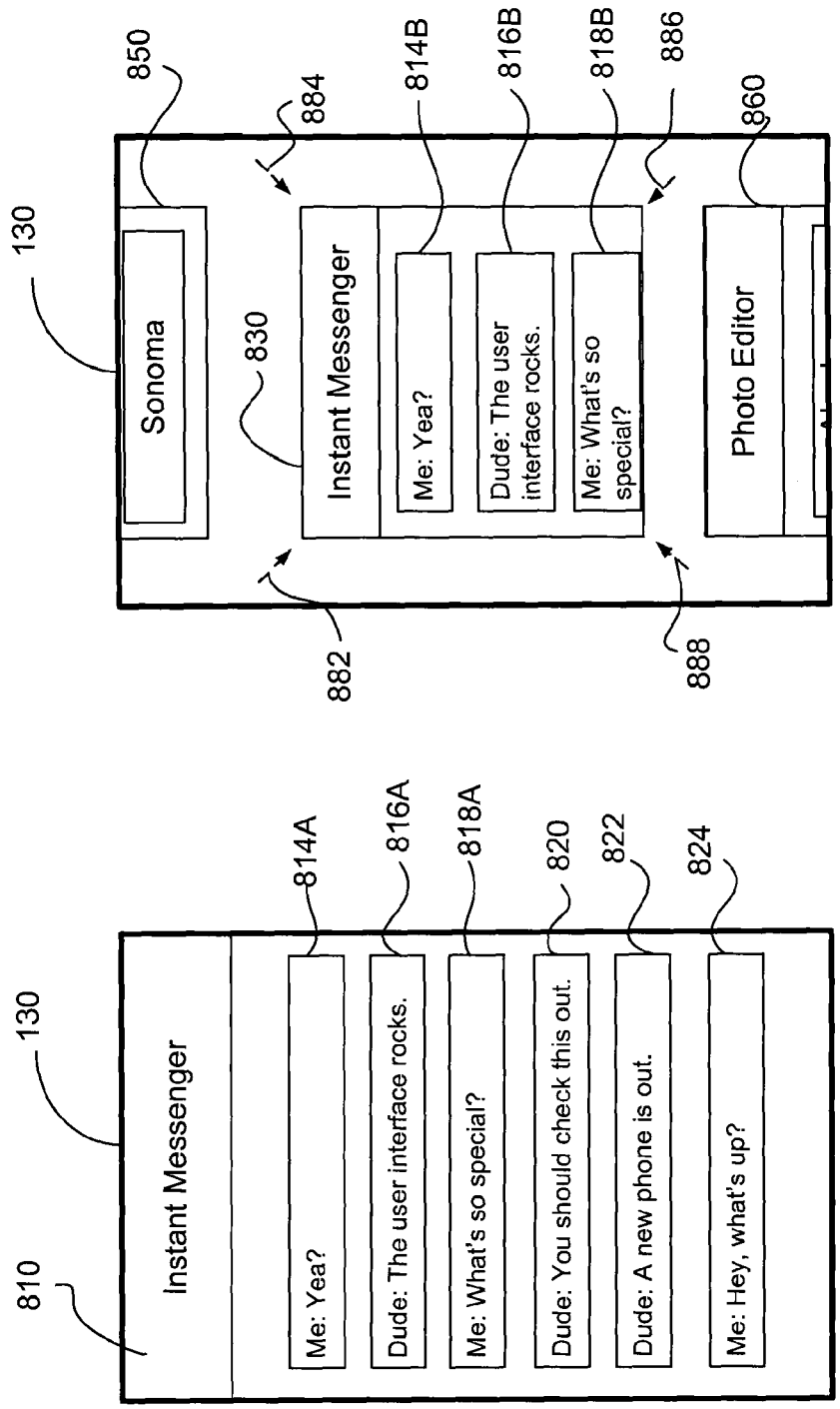
FIGS. 8A and 8B are diagrams illustrating a present view and a resized view for a photo application, according to one embodiment.
Figure 9:
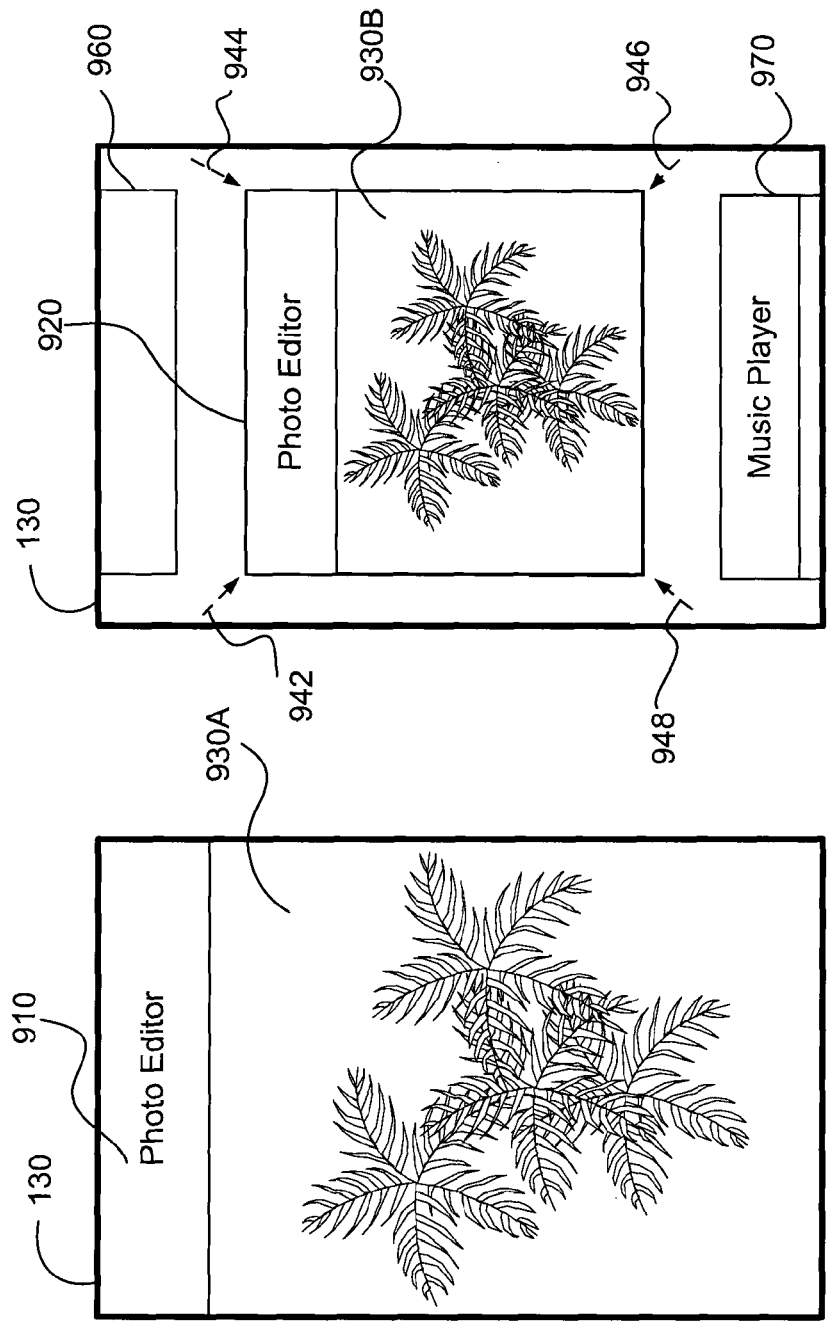
FIGS. 9A and 9B are diagrams illustrating a present view and a resized view for a phote editor application, according to one embodiment.

FIG. 5 is a block diagram of a transition manager 336, according to one embodiment. The transition manager 336 generates the subsequent view and the intermediate transition views displaying the transition between the present view and the subsequent view. The transition manager 336 includes, among other components, a zoom module 510, a cropping module 520, a crossfading module 530, a sliding module 540, and a rotating module 550. Each to these components, by itself or in combination with other components, functions to generate images for different types of transition views.

The zoom module 510 functions to render the scaled versions of the visual elements having a size as determined by the visual layout scaler 332. In one embodiment, the zoom module 510 scales the bitmap of the visual elements to a larger or a smaller size. In another embodiment, the zoom module 510 also scales visual elements that are vector images.

The cropping module 520 functions to crop the visual elements to a smaller size. The area of the visual elements to be cropped may be determined by the scaling manager 420. The cropping module 520 may be used in conjunction with the zoom module 510 to generate visual elements that are scaled and cropped at a certain ratio as determined by the visual layout scaler 332.

The crossfading module 530 functions to implement visual effects where one visual element gradually fades out while another visual element gradually appears. To render such effect, the crossfading module 530 is provided with a set of visual elements that appears in the present view but disappears in the subsequent view and another set of visual elements that does not appear in the present view but newly appears in the subsequent view. The crossfading module 530 then renders transient visual elements for display on the display screen 130.

The sliding module 540 functions to implement visual effects where one or more visual elements move from one location in the present view to another location in the subsequent view. The rotating module 550 functions to implement visual effects where one or more visual elements are rotated from one orientation to another orientation.

As the size of the application view is reduced, there may be insufficient space to display all the visual elements associated with the application. Therefore, the visual elements selected by the scaling manager 420 are retained in the application views of smaller sizes whereas some visual elements are discarded from the application views. Contrast this with bitmap downscaling of all the visual elements where all of the visual elements are scaled down at the same ratio. When all of the visual elements are scaled down at the same ratio, it becomes difficult to obtain meaningful information from the application views.

Described below are examples of four applications changing from the present view to the subsequent view. These examples are merely illustrative and different configurations or combination of transition views and the subsequent views may be rendered. Further, although the following examples illustrate scaling down or cropping of the images to transition to a smaller application view, it is also possible to transition to an application view that is larger, rotated, shifted to a different location, colored differently, or any combinations thereof.

Example of View Transition for Regular or Repeating Visual Element without Point of Interest FIGS. 6A to 6C are diagrams illustrating transition of a view (i.e., window) for an email client application, according to one embodiment. The email client programs have regular or repeating visual elements such as visual elements identifying senders, time, and subject of the email. Further, one email message generally does not have priority over another email message. All unread email messages are generally assigned the same priority. Therefore, there is no email message that may be treated as a 'point of interest.'

In the example of FIGS. 6A through 6C, visual elements regarding the sender of the emails are determined important whereas visual elements related to the bodies of the emails are deemed less important. In one embodiment, the importance of the visual element is determined by analyzing the presentation description 312 for the email client program, as described above with reference to FIGS. 3A and 3B. In another embodiment, the importance of the visual elements is also determined by user preferences received from the user. In this example, because the visual element regarding the sender of the email is more important than the visual elements representing the bodies of the emails, the visual elements indicating the sender of the email are retained in the application view of reduced size whereas the text boxes indicating the body of the emails are removed or discarded.

FIG. 6A is a diagram illustrating an example application view 610 where the view of the email client program is maximized. The view 610 displays eight (8) text boxes as visual elements. The text boxes 612A, 614A, 616A, 618A indicate the sender of the email messages. The text boxes 622A, 624A, 626A, 628A indicate the body of the email messages. The user may view details of a certain email by selecting one of the text boxes representing that email.

FIG. 6B is a diagram illustrating a transition view 620 transiting from the maximized view 610 to a smaller resized view 630 after an event for zooming out from the maximized view 610 is detected. The transition view 620 is reduced in size compared to the maximized view 610 as indicated by arrows 622A through 622D. The text boxes 612B, 614B, 616B, 618B indicating the sender of the email are also reduced in size. The text boxes 622A, 624B, 626B, 628B indicating the bodies of the emails are reduced in size as well as faded in color.

FIG. 6C is a diagram illustrating a resized view 630 of the email client program. The subsequent view 630 displays the text boxes 612C, 614C, 616C, 618C indicating the senders of the emails. The text boxes for the bodies of the emails, however, are removed and not displayed in the resized view 630. The display screen 130 of the computing device of FIG. 6C also displays application views 650, 660 for other applications. The user may scroll the screen 130 to select other applications running on the computing device.

Example of View Transition for Irregular or Arbitrary Visual Element with Point of Interest FIGS. 7A and 7B are diagrams illustrating transition of a view (i.e., window) for a map service application, according to one embodiment. Maps have irregular or arbitrary visual elements because the visual elements in maps do not have recurring patterns. The visual elements for roads and address are included in the maps but these elements do not appear in a repeated and regular manner. Also, maps are visual elements having a point of interest because the user has a point or region in the map that user is particularly interested in. The point of interest is often located at the center of the map. It is desirable to render application views for such as map service applications so that the information about the point of interest is kept intact or minimally modified in different views.

FIG. 7A illustrates a maximized view 720 of the map service application displayed on the display screen 130 according to one embodiment. The maximized view 720 includes a text box 740 including a string of characters representing the point of interest in the map ('100 First Street, Second City, Calif.'), and an image 750 showing the bitmap of an area around the point of interest. The exact location of the point of interest is indicated by an arrow 760. In one embodiment, the arrow 760 is part of the bitmap image file representing the map. In another embodiment, the arrow 760 is a separate visual element (e.g., an icon) generated by the map service application.

FIG. 7B illustrates a resized view 770 of the map service application displayed on the display screen 130 after an event for zooming out from the maximized view 710 of the map service application is detected. The resized view 770 is smaller in size compared to the maximized view 720 of FIG. 7A (as indicated by arrows 782, 784, 786, 788) and has less space to display the full map. Therefore, the map 750 is cropped by the cropping module 520 to generate a map 726 reduced in size. The text box 724 is retained but scaled down to a smaller size by the zooming module 510 so that the text box 724 can be accommodated in the resized view 770.

By having different visual elements (the text box 740, and the map 750) modified in a different manner, more information can be conveyed to the user compared to the case where all the visual elements are modified in the same manner. For example, if the map 750 was scaled down in size instead of being cropped, the name of the roads appearing in the map may be too small to be legible. Therefore, the scaled down map will not provide meaningful information to the user.

Example of View Transition for Regular or Repeating Visual Element with Point of Interest FIGS. 8A and 8B are diagrams illustrating transition of a view (i.e., window) for an instant messenger application, according to one embodiment. The instant messenger has regular or repeating visual elements such as text boxes indicating senders and messages. The visual elements in the instant messenger also have points of interest because recent messages are more important than the older messages. Another difference from the emails is that the senders of the message in email messages do not provide much information because there are generally a small number of participants in a session of the instant messenger. Therefore, the preferred scheme of selecting and configuration the visual elements in the instant messenger is to display recent instant messages exchanged by the participants in current session of the instant messenger.

FIG. 8A illustrates a maximized view 810 of the instant messenger application displayed on the display device 130 according to one embodiment. The maximized view 810 includes text boxes 814A, 816A, 818A, 820, 822, 824 as visual elements representing messages exchanged between participants of the instant messaging.

FIG. 8B illustrates a resized view 830 of the instant messenger application after an event for scaling down the maximized view 810 is detected. The resized view 830 is smaller in size compared to the maximized view 810 as indicated by arrows 882, 884, 886, 888. The resized view 830 includes only three text boxes 814B, 816B, 818B representing three most recently exchanged messages between the participants. The text boxes 814B, 816B, 818B are also vertically shrunk so that the text boxes 814B, 816B, 818B fit into the reduced space available on the resized view 830. Three text boxes 820, 822, 824 representing older messages are removed from the resized view 830. The screen 130 in FIG. 8B also displays application views 850, 860 for other applications.

Example of View Transition for Irregular or Arbitrary Visual Element with No Point of Interest FIGS. 9A and 9B are diagrams illustrating transition of a view (i.e., window) for a photo editor application, according to one embodiment. The photo editor application in this example is used for editing digital photographs loaded onto the mobile computing device 110. The digital photographs have irregular and arbitrary visual elements because digital photograph does not have visual elements appearing in repeated and regular manner. Further, in digital photographs, it is not apparent which portion of the digital photographs is more important than other portions of the digital images. Therefore, there is no apparent point of interest in digital photographs. Due to lack of the point of interest, it is difficult to determine which portions of the digital photograph should be cropped to conserve important information. Hence, scaling down of the image with minimal or no cropping is a suitable transition scheme when generating the resized view for digital photographs.

FIG. 9A illustrates a maximized view 910 of the photo editor application displayed on the display screen 130. The photo editor application displays an image (visual element) 930A illustrating the photograph being edited.

FIG. 9B illustrates a resized view 920 of the photo editor application displayed on the display screen 130 after an event for zooming out from the maximized view 910 is detected. The image (visual element) 930A is scaled down by the zooming module 510 into a resized image 930B as indicated by arrows 942, 944, 946, 948 so that the resized image 930B fits into the resized view 920 of the photo editor application. The resized image 930B is also partially cropped at the top and bottom portion. Application views 960, 970 of other applications are also displayed on the display screen 130.

As illustrated in the above examples, the visual elements are modified in different views based on the presentation description 312 provided by the applications. In one embodiment, the presentation description 312 describes which of the following four (4) classes the application corresponds to: (i) applications displaying visual elements that are regular or repeated and have no point of interest (for example, as described above with reference to FIGS. 6A through 6C), (ii) applications displaying visual elements that are irregular or arbitrary and having point of interest (for example, as described above with reference to FIGS. 7A and 7B), (iii) applications displaying visual elements that are regular or repeated and having points of interest (for example, as described above with reference to FIGS. 8A and 8B), and (iv) applications displaying visual element that are irregular or arbitrary and having no point of interest (for example, as described above with reference to FIGS. 9A and 9B). It is also possible to use any combination of scaling schemes for different visual elements in one application.

Method of Resizing Application Views

Figure 10:
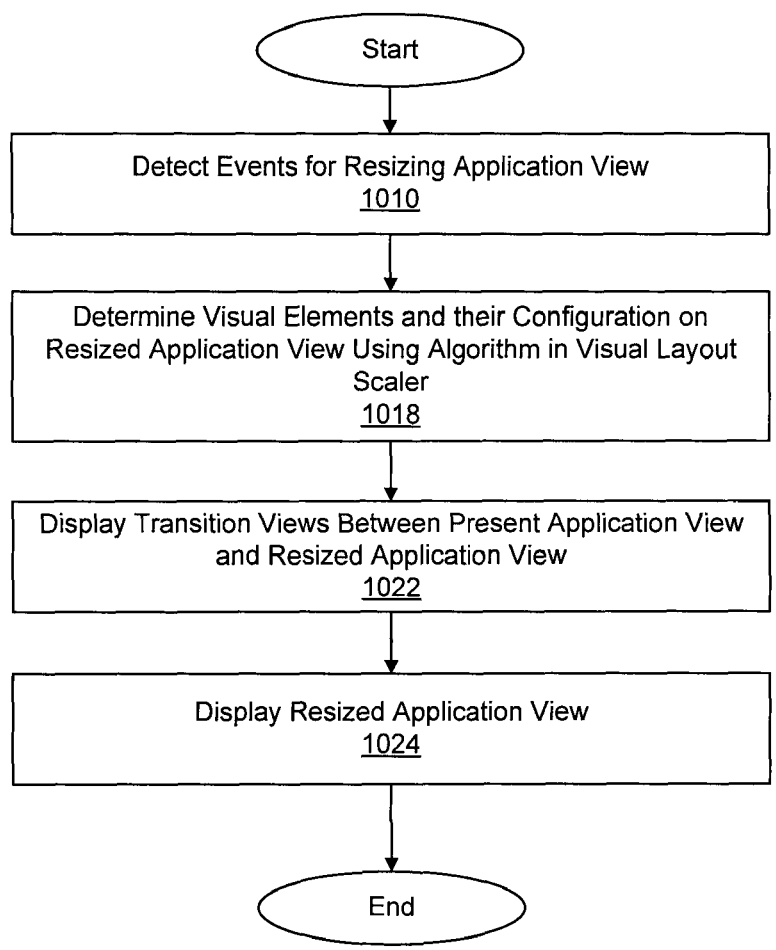
FIG. 10 is a flow chart illustrating a method of resizing an application view, according to one embodiment.

FIG. 10 is a flow chart illustrating a method of resizing an application view, according to one embodiment. First, an event for resizing the application view is detected 1010. The event for resizing the application view may include, among others, clicking of switches, detection of user inputs at a touchscreen, pressing of a keypad, elapse of time, and termination of certain operations at the application. After the events for resizing the visual elements are detected, the visual elements to be present in a subsequent view and their configurations (e.g., size, orientation, and color) of the visual elements in the subsequent view are determined 1018 by the visual layout scaler 332, as described below in detail with reference to FIG. 11.

The transition views between the present application view and the resized application view are then displayed 1022 on the display screen 130. The transition views provide continuous and seamless transition of visual elements from the present view to the resized view. The resized application view is then displayed 1024 on the display screen 130. The sequence of steps as illustrated in FIG. 10 is merely illustrative and alternative sequences of steps may also be used.

Figure 11:
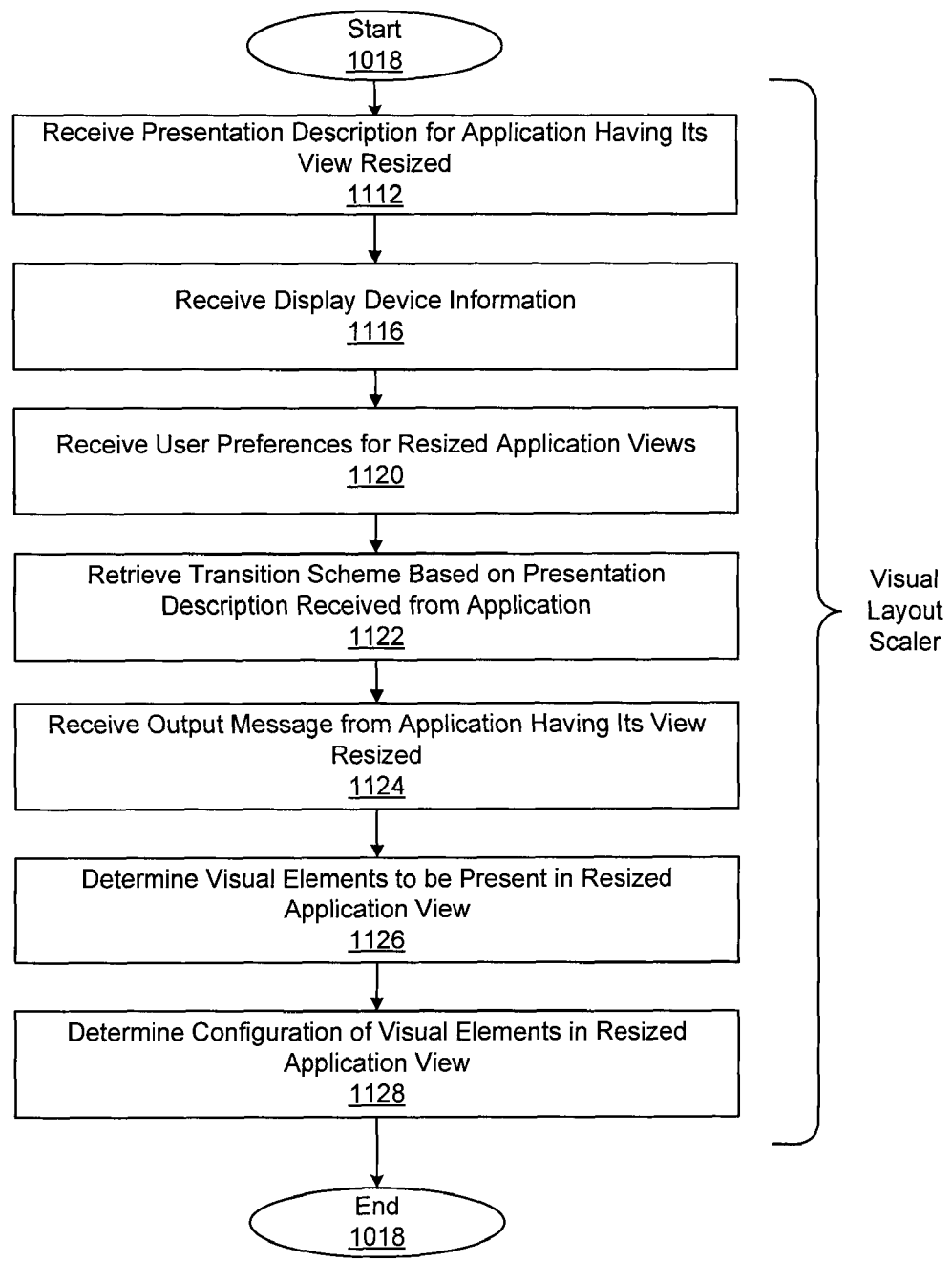
FIG. 11 is a flow chart for process of determing visual elements to be displayed and their configuration, according to one embodiment.

FIG. 11 is a flow chart for a process of determining visual elements to be displayed on the resized view and their configurations in the resized view, according to one embodiment. First, the visual layout scaler 332 receives 1112 the presentation description 312 from the application having its view resized. The visual layout scaler 332 also receives the display device information 340 indicating the capability (e.g., resolution or screen size) of the display screen 130.

In one embodiment, the visual layout scaler 332 receives 1120 user preferences for resized application views. The user preferences may indicate, among others, the minimum font size for visual elements, preferred color schemes for the resized application views, transition schemes to be used for different applications, the importance of the visual elements, and size of the reduced views. The visual layout scaler also receives 1124 output messages 306 from the application indicating the actual visual element to be displayed on the application view.

Based on the presentation description 312, the display device information 340, the user preference 424, and the transition schemes 422, and the output message 306, the visual layout scaler 332 determines 1126 the visual elements to be present in the resized application view. Then, the visual layout scaler 332 determines 1128 the configuration (e.g., size, color and orientation) of the visual elements to be presented in the resized application view.

The sequence of steps illustrated in FIG. 11 is merely illustrative. Alternative sequences of steps may also be used to determine visual elements to be displayed on the resized window and configure the visual elements to be presented. Further, two or more steps in FIG. 11 may be performed in parallel.

Figure 12:
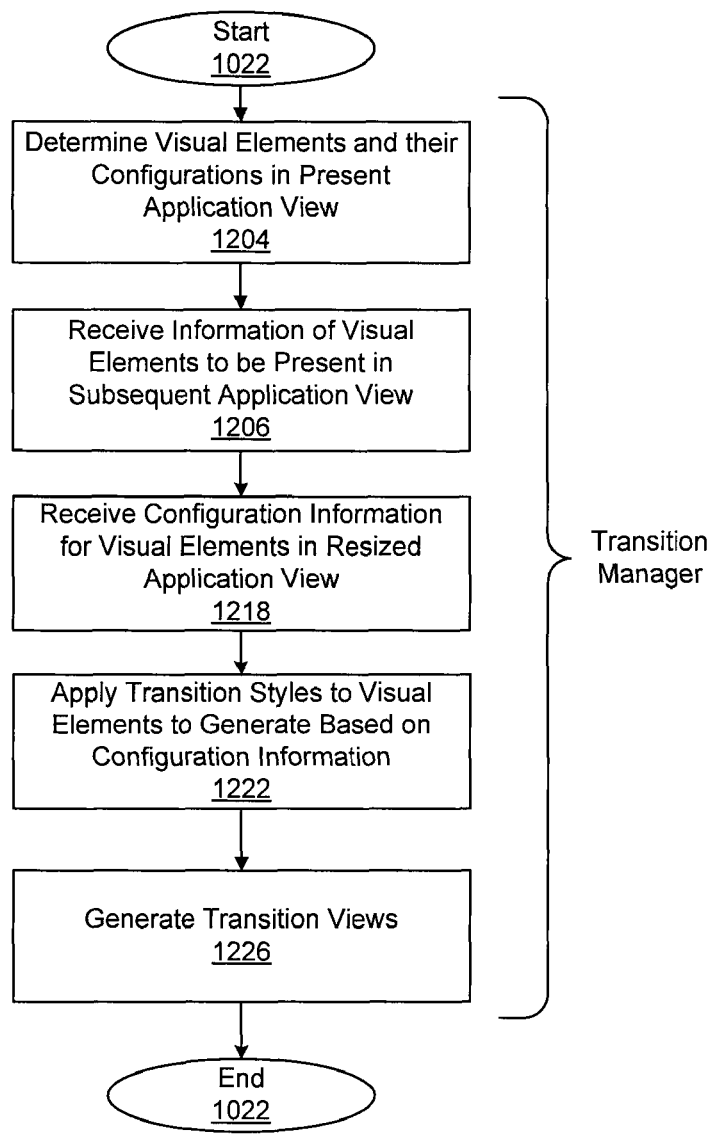
FIG. 12 is a flow chart for a process of displaying transition of the visual elements, according to one embodiment.

FIG. 12 is a flow chart for a method of displaying transition of the visual elements, according to one embodiment. First, the transition manager 336 determines 1204 the visual elements and the configuration of visual elements in the present application. The transition manager 336 then receives 1206 information on which visual elements are to be presented in the subsequent application view from the visual layout scaler 332. The transition manager 336 also receives configuration information from the visual layout scaler 332 that indicates the configuration of the visual elements.

The transition manager 336 then applies 1222 transition styles to the visual elements that appear, disappear or become modified in the resized screen, for example, as described in a co-pending U.S. patent application Ser. No. 12/021,173, titled "Structured Display System with System Defined Transitions," filed on Jan. 28, 2008, which is incorporated by reference herein in its entirety. Then the transition manager 336 generates one or more transition views that show continuous and seamless transition from the present application view to the subsequent application view.

The sequence of steps illustrated in FIG. 12 is merely illustrative, and alternative sequences of steps may be used to displaying transition of the visual elements. Further, two or more steps in FIG. 12 may be performed in parallel.

Alternative Embodiments

Although the process described herein has been in the context of a mobile computing device and display of the resized application views, the principles disclosed herein are applicable to other computing devices and platforms.

Also, the process described herein may be used to generate outputs other than visual elements such as audio sounds, tactile, haptic or any other sensation that a user can perceive and producible by a machine.

As noted above, embodiments may be configured as software elements or modules. The software may be processes (e.g., as described with reference to FIGS. 10 to 12) that are written or coded as instructions using a programming language. Examples of programming languages may include C, C++, BASIC, Perl, Matlab, Pascal, Visual BASIC, JAVA, ActiveX, assembly language, machine code, and so forth. The instructions may include any suitable type of code, such as source code, object code, compiled code, interpreted code, executable code, static code, dynamic code, and the like. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

Some embodiments may be implemented, for example, using any tangible computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Embodiments of the present disclosure provide a system and a method that presents visual elements to a user in a manner that allows information associated with the application to be presented to the users in an efficient and optimal manner within the constraints of the limited available space on a display screen. The users may obtain more information about the application from even a reduced application view to allow the users to take informed actions.

Upon reading this disclosure, those of skill in the art will appreciate still additional alternative structural and functional designs for a system and a process that generates outputs via an output device of a computing device. Thus, while particular embodiments and applications have been illustrated and described, it is to be understood that the disclosed embodiments are not limited to the precise construction and components disclosed herein and that various modifications, changes and variations will be apparent to those skilled in the art may be made in the arrangement, operation and details of the method and apparatus of the present embodiments disclosed herein without departing from the spirit and scope as defined in the appended claims.

What is claimed is:

1. A computer implemented method for displaying views for applications on a display screen, the method comprising:
   storing a presentation description for each of a plurality of applications, the presentation description defining a logical structure of visual elements associated with each application;
   receiving, at an operating system, a message from an application, the message including contents corresponding to visual elements; displaying a first view of the application, the first view including at least a subset of the visual elements defined in the presentation description of the application; receiving an instruction to transition from the first view of an application to a second view of the application; and determining a display configuration of the second view of the application at least by analyzing the presentation description of the application, the display configuration of the second view comprising a presentation format that conveys at least a subset of the contents in a format that differs from that of the first view, the presentation description indicating whether the application corresponds to one of a number of predetermined classes of applications, a class of applications defining general characteristics of applications, each class of applications having a predetermined transition scheme for displaying visual elements in different views.

2. The method of claim 1, further comprising: receiving display device information representing a hardware configuration of the display screen; and determining the display configuration of the second view to comply with the display device information.

3. The method of claim 1, further comprising: receiving a user preference for displaying the visual elements associated with the application on the display screen; and
   determining the display configuration of the second view by applying the user preference.

4. The method of claim 1, further comprising displaying images transitioning from the first view of the application to the second view and displaying the second view of the application, the second view including at least the subset of the contents in the message formatted according to the determined display configuration of the second view.

5. The method of claim 1, wherein the second view is scaled in size compared to the first view, and wherein determining the display configuration of the second view comprises determining a size and presence of each visual element in the second view.

6. The method of claim 1, wherein determining the display configuration of the second view comprises comparing first visual components in the first view to second visual components in the second view.

7. The method of claim 1, wherein determining the display configuration of the second view comprises determining a priority of the visual elements in the first view.

8. The method of claim 7, wherein the display configuration of the second view is formatted to preferably display a number of visual elements with a higher priority relative to visual elements with a lower priority.

9. A user interface subsystem for displaying views for one or more applications on a display screen, a display manager comprising:
   a plurality of applications, each application storing a presentation description; and an operating system adapted to: store transition schemes for a number of predetermined classes of applications, a class of applications defining general characteristics of applications, each class of applications having a predetermined transition scheme for visual elements; receive a message from an application, the message including contents corresponding to visual elements that are defined in a presentation description of the application; display a first view of the application including at least a subset of the visual elements defined in the presentation description; receive an instruction to transition from the first view of the application to a second view of the application, the second view of the application having a size different from the first view; and
   determine at the operating system a display configuration of the second view of the application by analyzing the presentation description of the application and by selecting a predetermined transition scheme, the predetermined transition scheme corresponding to a predetermined class of applications to which the application corresponds, the display configuration of the second view comprising a presentation format that conveys at least a subset of the contents in a format that differs from that of the first view.

10. The display manager of claim 9, wherein the operating system is further adapted to receive a display device information representing a hardware configuration of the display screen, the display configuration of the second view determined by the operating system to comply with hardware configuration of the display screen as identified by the display device information.

11. The display manager of claim 9, wherein the operating system is adapted to receive a user preference for displaying the visual elements associated with the application on the screen, the display configuration of the second view determined by the operating system to comply with the user preference.

12. The display manager of claim 9, wherein the display configuration represents display images transitioning from the first view of the application to the second view of the application and display the second view of the application including at least the subset of the contents in the message formatted according to the determined display configuration of the second view.

13. A computer readable medium storing instructions thereon, the instructions when executed by a processor cause the processor to: store a presentation description for each of a plurality of applications, the presentation description defining a logical structure of visual elements associated with each application; receive, at an operating system, a message from an application, the message including contents corresponding to visual elements; display a first view of the application on a display screen, the first view including at least a subset of the visual elements defined in the presentation description; receive an instruction to transition from the first view of the application to a second view of the application, the second view having a size different form the first view; determine at the operating system a display configuration of the second view of the application at least by analyzing the presentation description of the application, the presentation description indicating whether the application corresponds to one of a number of predetermined classes of applications, a class of applications defining general characteristics of applications, each class of applications having a predetermined transition scheme for displaying visual elements in different views; and display images transitioning from the first view of the application to the second view and display the second view of the application on the display screen, the second view including at least a subset of contents in the message formatted according to the determined display configuration of the second view.

14. A computer readable medium storing instructions thereon, the instructions when executed by a processor cause the processor to:
    store a presentation description for each of a plurality of applications, the presentation description defining a logical structure of visual elements associated with each application;
    receive, at an operating system, a message from an application, the message including contents corresponding to visual elements;
    display a first view of the application on a display screen, the first view including at least a subset of the visual elements defined in the presentation description;
    receive an instruction to transition from the first view of the application to a second view of the application, the second view having a size different from the first view;
    determine at the operating system a display configuration of the second view of the application at least by analyzing the presentation description of the application, the presentation description indicating whether the application corresponds to one of a number of predetermined classes of applications, a class of applications defining general characteristics of applications, each class of applications having a predetermined transition scheme for displaying visual elements in different views;
    receive display device information representing a hardware configuration of the display screen; and
    determine the display configuration of the second view to comply with the display device information.

15. A computer readable medium storing instructions thereon, the instructions when executed by a processor cause the processor to:
    store a presentation description for each of a plurality of applications, the presentation description defining a logical structure of visual elements associated with each application;
    receive, at an operating system, a message from an application, the message including contents corresponding to visual elements;
    display a first view of the application on a display screen, the first view including at least a subset of the visual elements defined in the presentation description;
    receive an instruction to transition from the first view of the application to a second view of the application, the second view having a size different from the first view;
    determine at the operating system a display configuration of the second view of the application at least by analyzing the presentation description of the application, the presentation description indicating whether the application corresponds to one of a number of predetermined classes of applications, a class of applications defining general characteristics of applications, each class of applications having a predetermined transition scheme for displaying visual elements in different views;
    receive a user preference for displaying the visual elements associated with the application on the display screen; and
    determine the display configuration of the second view applying the user preference.

16. A computer readable medium storing instructions thereon, the instructions when executed by a processor cause the processor to:
    store a presentation description for each of a plurality of applications, the presentation description defining a logical structure of visual elements associated with each application;
    receive, at an operating system, a message from an application, the message including contents corresponding to visual elements;
    display a first view of the application on a display screen, the first view including at least a subset of the visual elements defined in the presentation description;
    receive an instruction to transition from the first view of the application to a second view of the application, the second view having a size different from the first view; and
    determine at the operating system a display configuration of the second view of the application at least by analyzing the presentation description of the application, the presentation description indicating whether the application corresponds to one of a number of predetermined classes of applications, a class of applications defining general characteristics of applications, each class of applications having a predetermined transition scheme for displaying visual elements in different views, wherein the second view is a scaled in size compared to the first view, and wherein instructions to determine the display configuration of the second view comprises instructions to determine a size and presence of each visual element in the second view.

17. A computer readable medium storing instructions thereon, the instructions when executed by a processor cause the processor to:
    store a presentation description for each of a plurality of applications, the presentation description defining a logical structure of visual elements associated with each application;
    receive, at an operating system, a message from an application, the message including contents corresponding to visual elements;
    display a first view of the application on a display screen, the first view including at least a subset of the visual elements defined in the presentation description;
    receive an instruction to transition from the first view of the application to a second view of the application, the second view having a size different from the first view; and
    determine at the operating system a display configuration of the second view of the application at least by analyzing the presentation description of the application, the presentation description indicating whether the application corresponds to one of a number of predetermined classes of applications, a class of applications defining general characteristics of applications, each class of applications having a predetermined transition scheme for displaying visual elements in different views, wherein instructions to determine the display configuration of the second view comprises instructions to compare first visual components in the first view to second visual components in the second view.

* * * * *